(12) United States Patent
Sego et al.

(10) Patent No.: US 8,593,334 B2
(45) Date of Patent: Nov. 26, 2013

(54) SPLIT APERTURE MONOPULSE ANTENNA SYSTEM

(75) Inventors: Daniel Joseph Sego, Shoreline, WA (US); David Arthur Whelan, Newport Coast, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/194,527

(22) Filed: Jul. 29, 2011

(65) Prior Publication Data

US 2013/0027241 A1    Jan. 31, 2013

(51) Int. Cl.
*G01S 13/00* (2006.01)

(52) U.S. Cl.
USPC ............ 342/154; 342/149; 342/152; 342/153

(58) Field of Classification Search
USPC .......................... 342/123, 149, 152, 153, 154
See application file for complete search history.

(56) References Cited

U.S. PATENT DOCUMENTS

| | | | | |
|---|---|---|---|---|
| 3,392,395 | A * | 7/1968 | Hannan | 343/755 |
| 4,404,561 | A * | 9/1983 | Mulder et al. | 342/147 |
| 5,612,702 | A * | 3/1997 | Kinsey | 342/427 |
| 6,005,512 | A * | 12/1999 | Wong | 342/80 |
| 6,175,330 | B1 * | 1/2001 | Reits | 342/371 |
| 6,483,478 | B2 * | 11/2002 | Yu et al. | 343/853 |
| 6,661,366 | B2 * | 12/2003 | Yu | 342/17 |
| 6,697,009 | B2 * | 2/2004 | Yu | 342/17 |
| 6,819,285 | B1 * | 11/2004 | Stockman et al. | 342/123 |
| 7,038,620 | B1 * | 5/2006 | Chubb et al. | 342/368 |
| 7,109,915 | B2 * | 9/2006 | Kurodai et al. | 342/82 |
| 7,250,902 | B2 * | 7/2007 | Manoogian et al. | 342/154 |
| 7,417,584 | B1 * | 8/2008 | Reifler et al. | 342/148 |
| 7,859,451 | B2 * | 12/2010 | Yu et al. | 342/149 |
| 2003/0085833 | A1 * | 5/2003 | Yu | 342/17 |
| 2004/0196172 | A1 | 10/2004 | Wasiewicz | |

(Continued)

FOREIGN PATENT DOCUMENTS

| | | |
|---|---|---|
| EP | 0141886 A1 | 5/1985 |
| EP | 1005103 A1 | 5/2000 |
| EP | 1229347 A2 | 8/2002 |
| WO | WO8804109 A1 | 6/1988 |

OTHER PUBLICATIONS

GB search report dated Sep. 4, 2012 regarding application GB1211690.1, applicant reference NAMM/BOE/P123097GB00, applicant The Boeing Company, 8 Pages.

(Continued)

*Primary Examiner* — Jack W Keith
*Assistant Examiner* — Peter Bythrow
(74) *Attorney, Agent, or Firm* — Yee & Associates, P.C.

(57) ABSTRACT

A method and apparatus for processing electromagnetic waves. Electromagnetic waves are transmitted in a selected direction toward a target object from a first array of antenna elements. Scattered electromagnetic waves generated from the electromagnetic waves are received at a first portion of a second array of antenna elements configured to receive the scattered electromagnetic waves in a first direction with respect to the selected direction and at a second portion of the second array of antenna elements configured to receive the scattered electromagnetic waves in a second direction with respect to the selected direction. First information in the scattered electromagnetic waves received by the first portion is subtracted from second information in the scattered electromagnetic waves received by the second portion to form difference data. An elevation angle is identified between a direction of the target object and the selected direction using the difference data.

22 Claims, 11 Drawing Sheets

(56) References Cited

U.S. PATENT DOCUMENTS

| | | | |
|---|---|---|---|
| 2004/0196173 A1* | 10/2004 | Kuroda et al. | 342/82 |
| 2006/0109172 A1* | 5/2006 | McCord et al. | 342/149 |
| 2010/0123617 A1* | 5/2010 | Yu et al. | 342/149 |

OTHER PUBLICATIONS

GB search report dated Aug. 6, 2013 regarding application GB1211690.1, applicant reference NAMM/AWP/JAS/P123097GB00, applicant The Boeing Company, 3 pages.

* cited by examiner

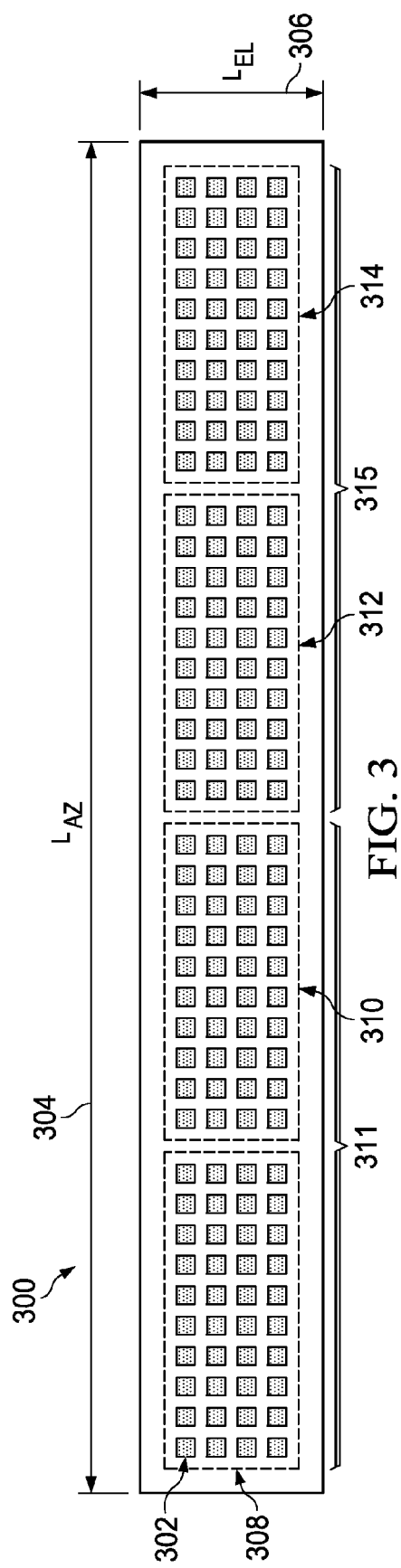
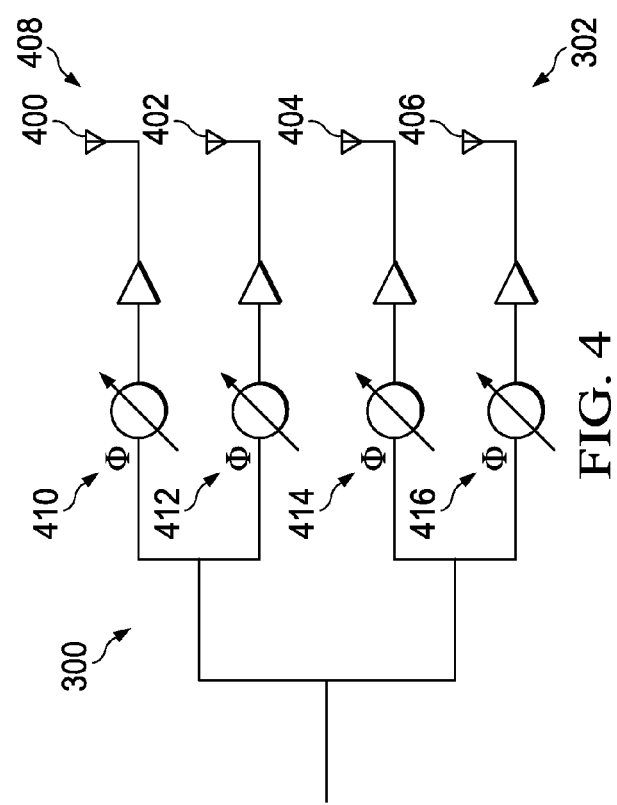
FIG. 3
FIG. 4

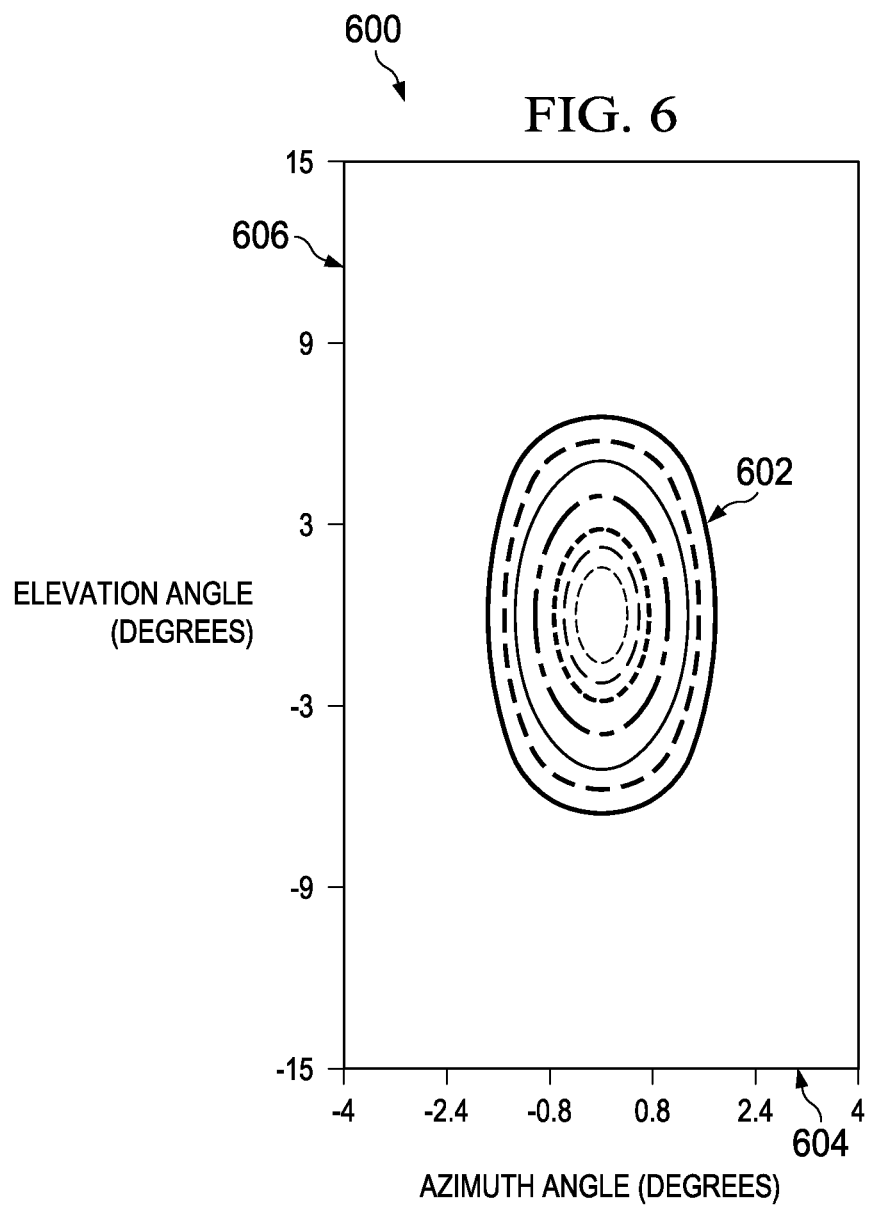

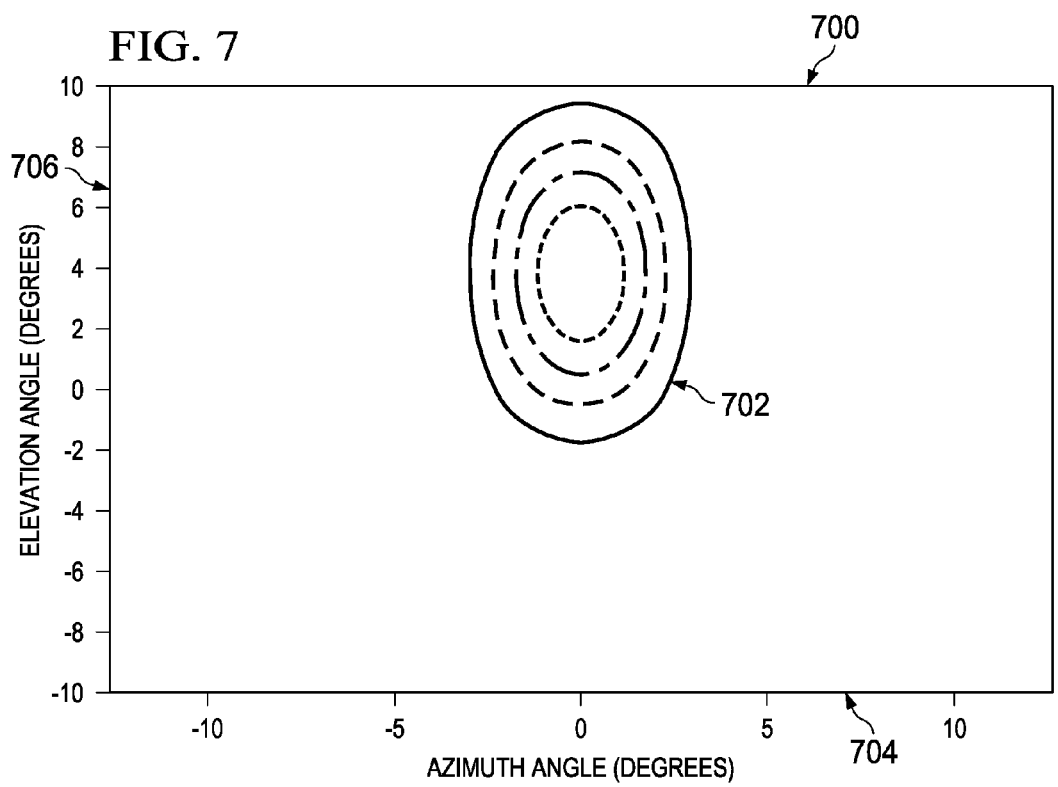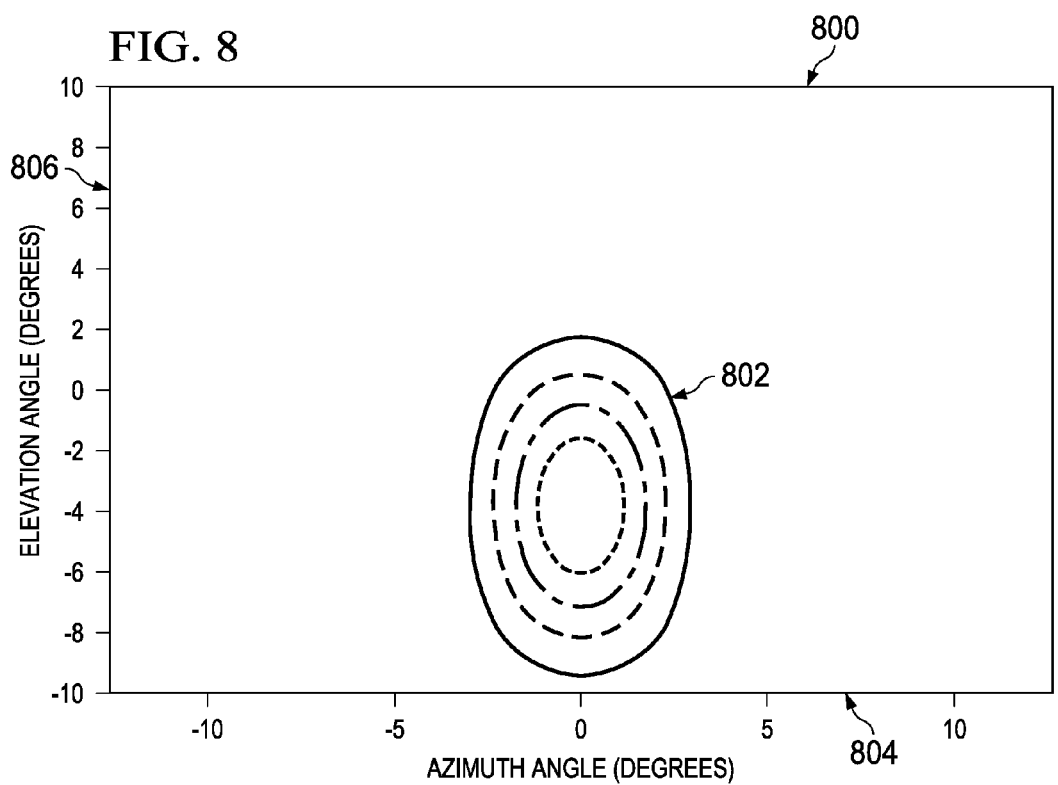

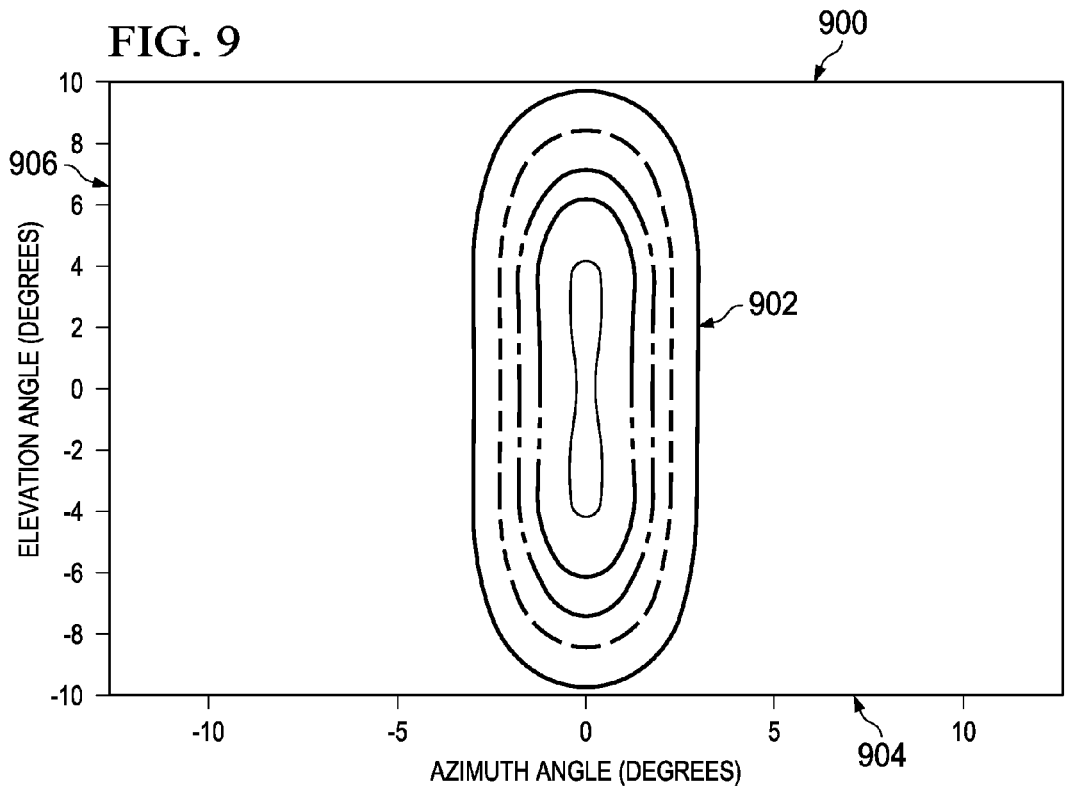
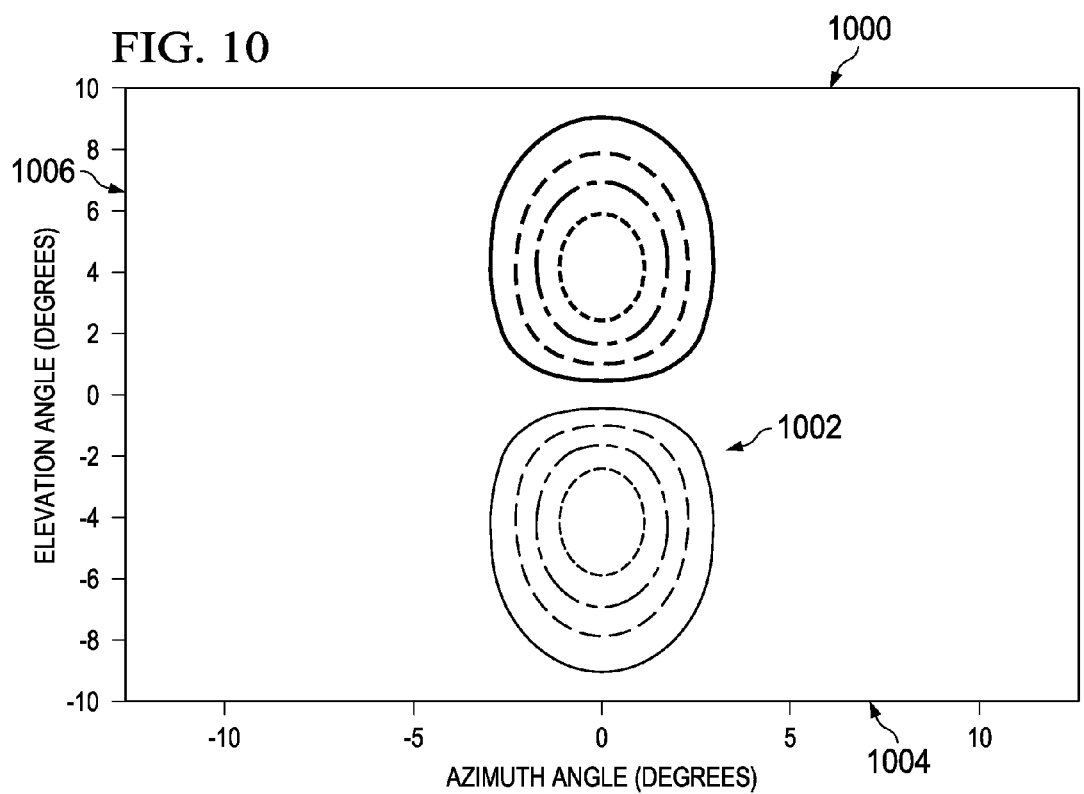

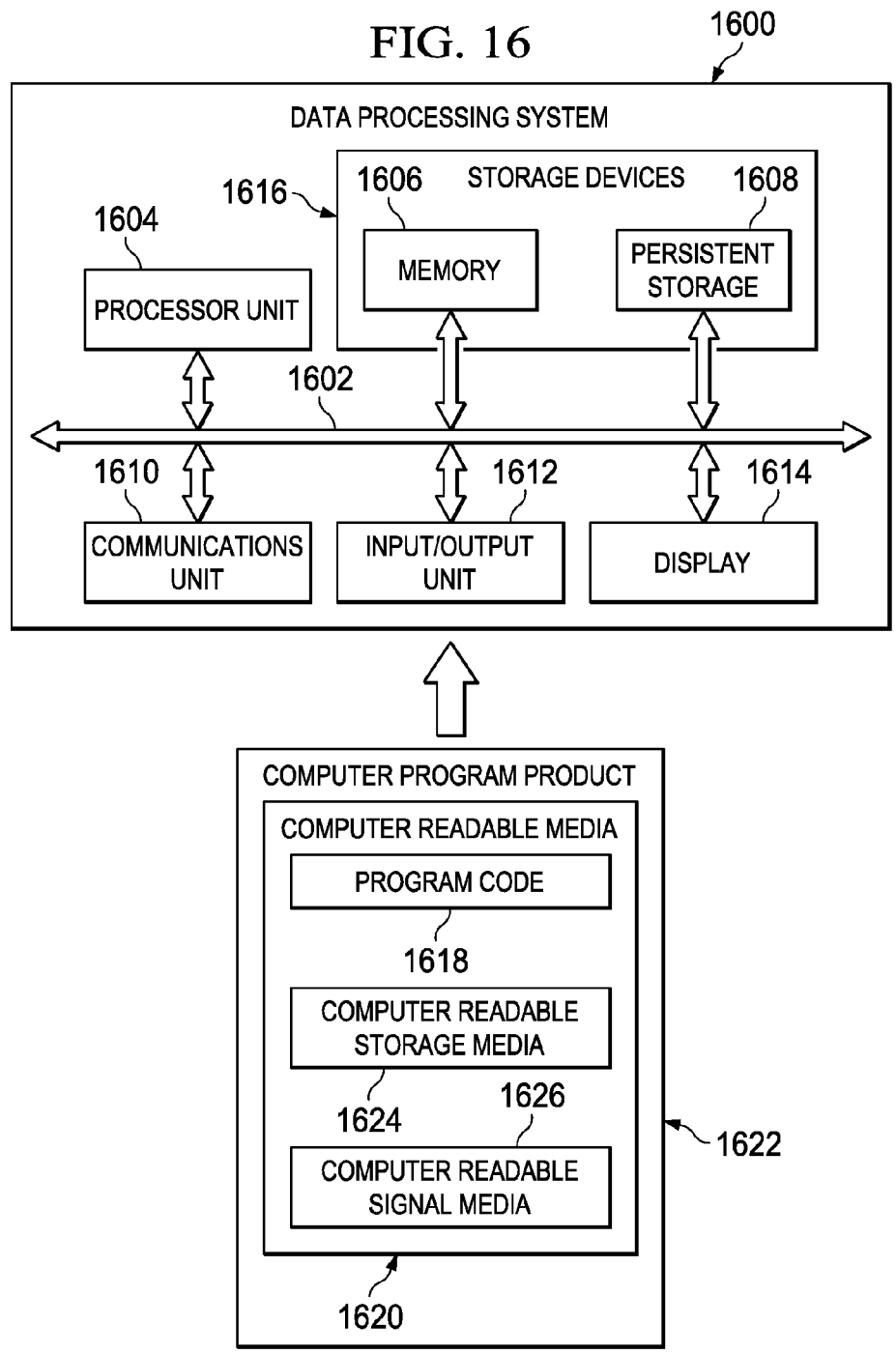

SPLIT APERTURE MONOPULSE ANTENNA SYSTEM

BACKGROUND INFORMATION

1. Field

The present disclosure relates generally to antennas and, in particular, to antennas used to identify information about objects. Still more particularly, the present disclosure relates to using an antenna system to identify a height of a target object.

2. Background

An antenna is an electrical device that couples electromagnetic waves to an electrical current that may be used by a transmitter and/or receiver. In other words, an antenna may be used to transmit and/or receive electromagnetic waves. These electromagnetic waves may be used to detect objects.

For example, radar systems use antennas to determine information about objects. This information may include range, altitude, direction, speed, and other information. This information may be obtained for objects, such as, for example, an aircraft, a ship, a spacecraft, a missile, a weather formation, a train, and/or other suitable types of objects.

In a radar system, the antenna is used to transmit electromagnetic waves towards a target object. When the electromagnetic waves encounter an object, a portion of the electromagnetic waves may bounce off the object. The portion of the electromagnetic waves that bounces off of the object may be referred to as scattered electromagnetic waves. These scattered electromagnetic waves may be received by the antenna and used to identify information about the object.

Many different types of antennas may be used with radar systems. Some examples of different types of antennas that may be used include a parabolic reflector, a slotted waveguide antenna, and a phased array antenna. A parabolic reflector is an antenna with a dish having a parabolic form used to transmit electromagnetic waves in the form of a beam. Another type of antenna is an antenna with a slotted waveguide. This type of antenna also is configured to generate electromagnetic waves in the form of a beam.

A phased array antenna is typically comprised of individual antenna elements that are electronically controlled to generate electromagnetic waves in the form of a beam. With a phased array antenna, the steering or direction of the beam may be controlled electronically rather than by physical movement of the antenna itself.

Different antennas have different advantages and disadvantages. For example, some antennas may require more power to transmit electromagnetic waves than other antennas. Different antennas may have different frequencies at which desired levels of performance may be provided in transmitting and/or detecting scattered electromagnetic waves. As another example, different antenna designs may have constraints in terms of their placement, shape, size, and/or weight. Further, with directional antennas, the beams that may be formed may have limited angles.

Therefore, it would be advantageous to have a method and apparatus that takes into account at least some of the issues discussed above, as well as possibly other issues.

SUMMARY

In one advantageous embodiment, a method for processing electromagnetic waves is provided. Electromagnetic waves are transmitted in a selected direction toward a target object from a first array of antenna elements. Scattered electromagnetic waves generated from the electromagnetic waves transmitted in the selected direction are received at a first portion of a second array of antenna elements. The first portion of the second array of antenna elements is configured to receive the scattered electromagnetic waves in a first direction with respect to the selected direction and at a second portion of the second array of antenna elements. The second portion of the second array of antenna elements is configured to receive the scattered electromagnetic waves in a second direction with respect to the selected direction. First information in the scattered electromagnetic waves received by the first portion of the second array of antenna elements is subtracted from second information in the scattered electromagnetic waves received by the second portion of the second array of antenna elements to form difference data. An elevation angle is identified between a direction of the target object and the selected direction using the difference data.

In another advantageous embodiment, an apparatus comprises a first array of antenna elements, a second array of antenna elements, and a signal processing module. The first array of antenna elements is configured to transmit electromagnetic waves toward a target object. The electromagnetic waves are transmitted having a selected direction. A first portion of the second array of antenna elements is configured to receive scattered electromagnetic waves generated in response to transmitting the electromagnetic waves toward the target object in a first direction with respect to the selected direction. A second portion of the second array of antenna elements is configured to receive the scattered electromagnetic waves in a second direction with respect to the selected direction. The signal processing module is configured to subtract first information in the scattered electromagnetic waves received by the first portion of the second array of antenna elements from second information in the scattered electromagnetic waves received by the second portion of the second array of antenna elements to form difference data. The signal processing module is further configured to identify an elevation angle between a direction of the target object and the selected direction using the difference data.

In yet another advantageous embodiment, an apparatus comprises an array of antenna elements, a transceiver, and a signal processing module. The array of antenna elements is configured to transmit electromagnetic waves in a selected direction toward a target object. A first portion of the array of antenna elements is electronically steered to receive scattered electromagnetic waves in a first direction with respect to the selected direction. A second portion of the array of antenna elements is electronically steered to receive the scattered electromagnetic waves in a second direction with respect to the selected direction. The scattered electromagnetic waves are generated in response to transmitting the electromagnetic waves toward the target object. The transceiver is connected to the array of antenna elements by a transmission medium. The transceiver is configured to generate first information from first signals received from the array of antenna elements in response to the first portion of the array of antenna elements receiving the scattered electromagnetic waves in the first direction and generate second information from second signals received from the array of antenna elements in response to the second portion of the array of antenna elements receiving the scattered electromagnetic waves in the second direction. The signal processing module is configured to add the first information and the second information to form summed data. The signal processing module is further configured to subtract the first information from the second information to form difference data. The signal processing module is further configured to identify an elevation angle between a direction of the target object and the selected direction using the difference data and the summed data.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 3 is an illustration of an antenna in accordance with an advantageous embodiment;

FIG. 4 is an illustration of a single column of an antenna in accordance with an advantageous embodiment;

FIG. 6 is an illustration of an image of a transmission pattern for an antenna in accordance with an advantageous embodiment;

FIG. 7 is an illustration of an image of a receive pattern for an antenna in accordance with an advantageous embodiment;

FIG. 8 is an illustration of an image of a receive pattern for an antenna in accordance with an advantageous embodiment;

FIG. 9 is an illustration of an image of a summation pattern in accordance with an advantageous embodiment;

FIG. 10 is an illustration of an image of a difference pattern in accordance with an advantageous embodiment;

FIG. 16 is an illustration of a data processing system in accordance with an advantageous embodiment.

DETAILED DESCRIPTION

Figure 1:
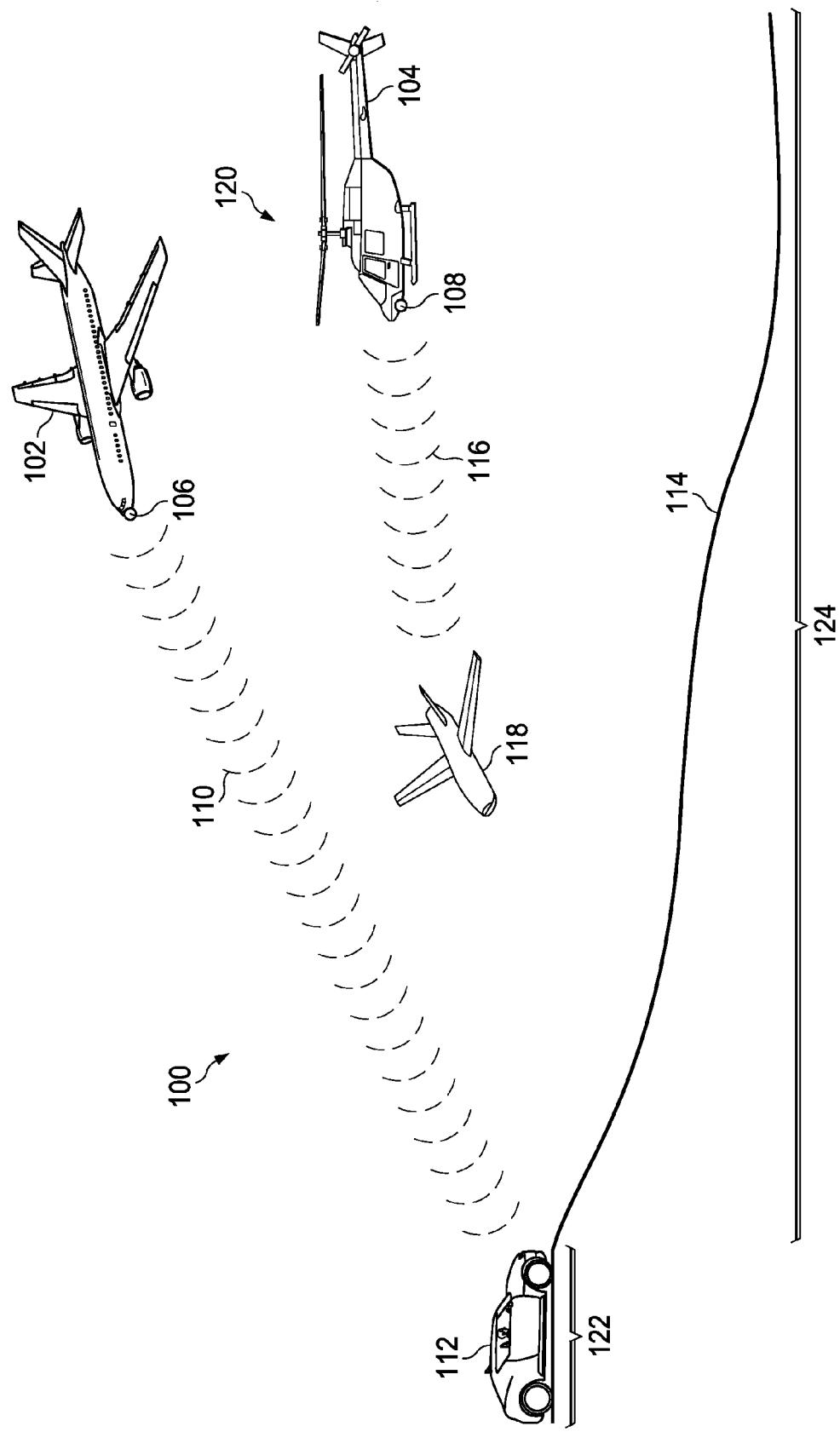
FIG. 1 is a pictorial illustration of an object identification environment in accordance with an advantageous embodiment.

The different advantageous embodiments recognize and take into account one or more different considerations. For example, the different advantageous embodiments recognize and take into account that placing a radar system in an aircraft may be useful. In particular, the radar system may be used to identify information about objects that may be around the aircraft. For example, with a radar system in an aircraft, the aircraft may identify information about objects in the air and on the ground. These objects may be, for example, buildings, people, vehicles, terrain, and other suitable types of objects.

The different advantageous embodiments recognize and take into account that radar systems in aircraft may be used to perform surveillance on the ground. For example, the antennas in these radar systems may be used for performing surveillance of target objects on the ground. However, the different advantageous embodiments recognize and take into account that the radar systems configured for performing surveillance on the ground may not be configured to perform surveillance of target objects in the air and/or in space as accurately as desired.

The different advantageous embodiments recognize and take into account that these radar systems may be unable to identify the height of target objects in the air and/or in space with respect to a reference height with a desired level of accuracy. The reference height may be, for example, sea level, ground level, or some other suitable reference height.

As a result, the different advantageous embodiments recognize and take into account that identifying the height of a target object in the air and/or in space within a desired level of accuracy may be desirable. Further, the different advantageous embodiments recognize and take into account that it may be desirable to control both the level of accuracy for the identification of the height of the target object and a level of sensitivity for the antenna.

Thus, the different advantageous embodiments provide a method and apparatus for processing electromagnetic waves. One or more of the different advantageous embodiments may be used to identify information about a target object that may include identifying the height of the target object.

In one advantageous embodiment, a method for processing electromagnetic waves is provided. Electromagnetic waves are transmitted towards a target object from a first array of antenna elements. The electromagnetic waves are transmitted having a selected direction. Scattered electromagnetic waves generated in response to transmitting the electromagnetic waves toward the target object are received at a first portion of a second array of antenna elements.

The first portion of the second array of antenna elements is configured to receive the scattered electromagnetic waves in a first direction with respect to the selected direction. The scattered electromagnetic waves are received at a second portion of the second array of antenna elements. The second portion of the second array of antenna elements is configured to receive the scattered electromagnetic waves in a second direction with respect to the selected direction.

First information in the scattered electromagnetic waves received by the first portion of the second array of antenna elements is subtracted from second information in the scattered electromagnetic waves received by the second portion of the second array of antenna elements to form difference data. An elevation angle is identified between a direction of the target object and the selected direction using the difference data.

With reference now to FIG. 1, a pictorial illustration of an object identification environment is depicted in accordance with an advantageous embodiment. Object identification environment 100 is an example of an environment in which an antenna in accordance with an advantageous embodiment may be implemented.

In this illustrative example, airplane 102 and rotorcraft 104 may implement radar systems in accordance with an advantageous embodiment. In particular, airplane 102 has antenna 106, and rotorcraft 104 has antenna 108. Antenna 106 and antenna 108 may be implemented in accordance with an advantageous embodiment.

Antenna 106 may transmit electromagnetic waves in the form of beam 110 in this illustrative example. Beam 110 is directed towards vehicle 112 traveling on ground 114. Antenna 108 on rotorcraft 104 transmits electromagnetic waves in the form of beam 116. Beam 116 is directed towards unmanned aerial vehicle (UAV) 118 in air 120. As depicted, ground 114 is not flat. Vehicle 112 is on portion 122 of ground 114 that is at a higher elevation than portion 124 of ground 114.

In these illustrative examples, antenna 106 on airplane 102 and antenna 108 on rotorcraft 104 are configured to allow an identification of the height of vehicle 112 and the height of unmanned aerial vehicle 118 with respect to a reference height. The reference height may be, for example, sea level, a height of portion 124 of ground 114, or some other suitable reference height.

In particular, antenna 106 and antenna 108 are configured to allow for an identification of an elevation angle that may be used to identify the height of vehicle 112 and the height of unmanned aerial vehicle 118, respectively. Vehicle 112 may be in a direction with respect to antenna 106, and unmanned aerial vehicle 118 may be in a direction with respect to antenna 108.

An elevation angle between the direction in which beam 110 is transmitted and the direction of vehicle 112 may be identified. In a similar fashion, an elevation angle between the direction in which beam 116 is transmitted and the direction of unmanned aerial vehicle 118 may be identified. These elevation angles may be used to identify the height of vehicle 112 and unmanned aerial vehicle 118.

Figure 2:
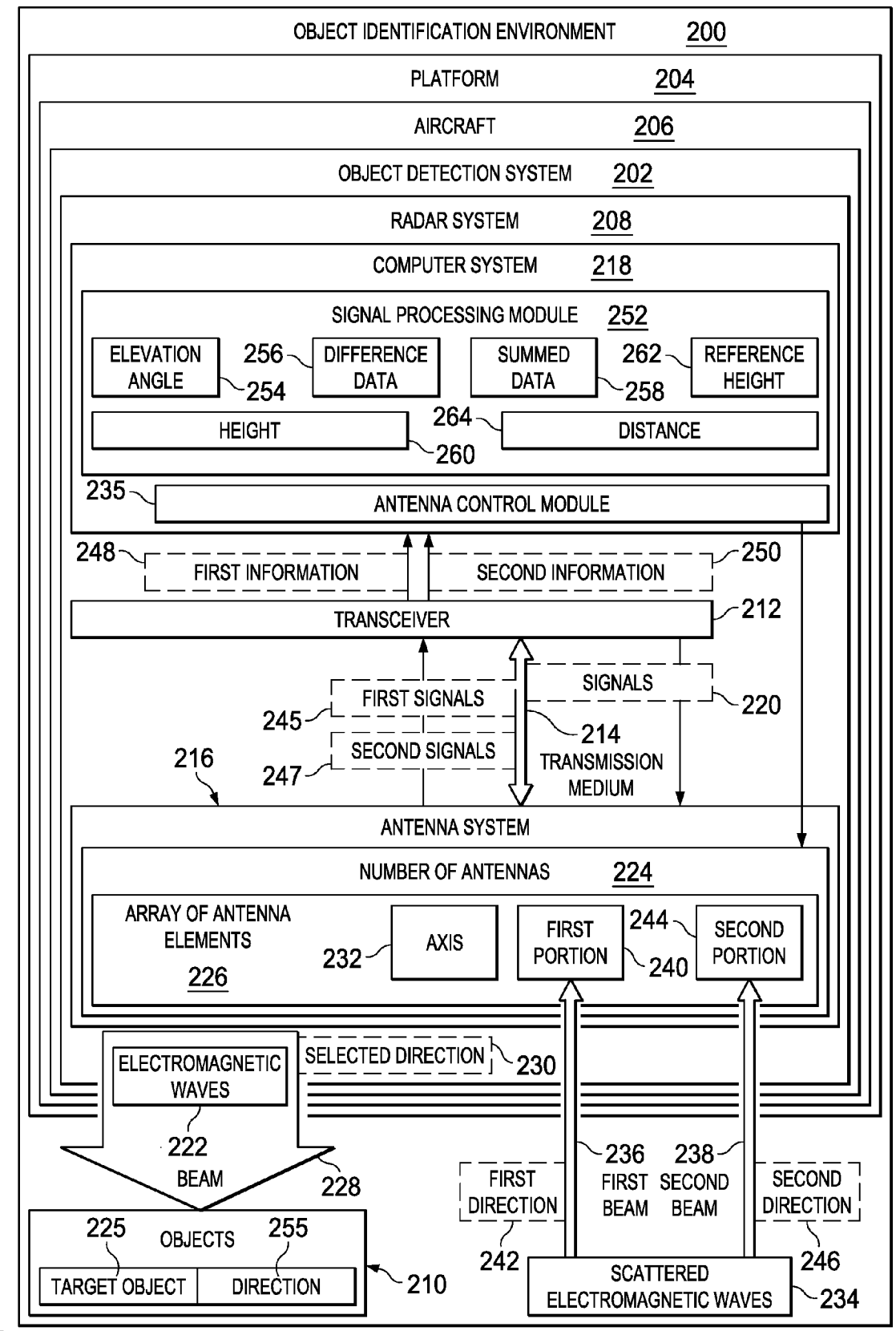
FIG. 2 is an illustration of a block diagram of an object identification environment in accordance with an advantageous embodiment.

With reference now to FIG. 2, an illustration of a block diagram of an object identification environment is depicted in accordance with an advantageous embodiment. Object identification environment 100 in FIG. 1 is an example of one implementation for object identification environment 200 shown in block form in FIG. 2.

In this depicted example, object identification environment 200 includes object detection system 202 and platform 204. Object detection system 202 is associated with platform 204. This association is a physical association in these examples. A first component, such as object detection system 202, may be considered to be associated with a second component, such as platform 204, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, platform 204 may be aircraft 206. Aircraft 206 may be implemented as airplane 102 in FIG. 1, rotorcraft 104 in FIG. 1, or some other suitable type of aircraft, depending on the particular implementation. For example, aircraft 206 may be an unmanned aerial vehicle.

As depicted, object detection system 202 takes the form of radar system 208. Object detection system 202 may be used to detect objects 210. In these illustrative examples, object detection system 202 comprises transceiver 212, transmission medium 214, antenna system 216, and computer system 218.

Transceiver 212 functions as a transmitter and receiver. Transceiver 212 is configured to generate signals 220. In particular, transceiver 212 may generate signals 220 in the form of a radio frequency signal that is sent to antenna system 216. Antenna system 216 is configured to receive signals 220 through transmission medium 214. Transmission medium 214 may be, for example, a waveguide, a transmission line, a coaxial cable, air, space, and/or some other suitable transmission medium through which signals 220 may travel to antenna system 216.

In response to receiving signals 220, antenna system 216 generates electromagnetic waves 222. In these illustrative examples, antenna system 216 comprises number of antennas 224. A number, as used herein with reference to items, means one or more items. For example, a number of antennas is one or more different antennas. Number of antennas 224 comprises array of antenna elements 226. Array of antenna elements 226 may be a two-dimensional array or a three-dimensional array.

Antenna system 216 may take the form of a phased array antenna system in these illustrative examples. In particular, array of antenna elements 226 is configured to transmit electromagnetic waves 222 in the form of beam 228 towards target object 225 in objects 210.

Computer system 218 comprises one or more computers that may be used to control the operation of transceiver 212 and antenna system 216. In particular, in these illustrative examples, antenna control module 235 in computer system 218 is configured to control transceiver 212 and array of antenna elements 226. Antenna control module 235 may be implemented using hardware, software, or a combination of the two.

Antenna control module 235 controls the operation of transceiver 212 and antenna system 216 such that beam 228 is transmitted in selected direction 230. In particular, antenna control module 235 is configured to electronically steer array of antenna elements 226 in selected direction 230.

Electronically steering array of antenna elements 226 includes controlling time delays and/or the phase for signals 220 received by array of antenna elements 226 such that electromagnetic waves 222 are transmitted in selected direction 230. In particular, the phase for each of array of antenna elements 226 may be shifted such that the pattern of transmission of electromagnetic waves 222 may be reinforced in selected direction 230. In other words, the amplitude of electromagnetic waves 222 may be increased in selected direction 230 as compared to other directions.

In these illustrative examples, selected direction 230 includes an elevation angle and an azimuth angle. In particular, selected direction 230 may comprise an elevation angle and an azimuth angle with respect to axis 232 through array of antenna elements 226. Axis 232 is an axis substantially perpendicular to array of antenna elements 226 in these illustrative examples.

As depicted, array of antenna elements 226 is configured to receive scattered electromagnetic waves 234 generated in response to the transmission of electromagnetic waves 222. Scattered electromagnetic waves 234 are generated by a portion of electromagnetic waves 222 reflecting off of one or more of objects 210 and/or a number of other surfaces. This portion may be some or all of electromagnetic waves 222.

In these illustrative examples, antenna control module 235 is configured to electronically steer array of antenna elements 226 such that scattered electromagnetic waves 234 are received at array of antennas elements 226 in the form of first beam 236 and second beam 238. Electronically steering array of antenna elements 226 includes controlling time delays for sending signals generated by array of antenna elements 226 in response to array of antenna elements 226 receiving scattered electromagnetic waves 234 to transceiver 212.

As depicted, antenna system 216 sends first signals 245 and second signals 247 through transmission medium 214 to transceiver 212 in response to forming first beam 236 and second beam 238, respectively. First signals 245 and second signals 247 may be alternating current signals in this illustrative example. In particular, these alternating current signals are radio frequency signals.

For example, antenna control module 235 is configured to electronically steer first portion 240 of array of antenna elements 226 to receive scattered electromagnetic waves 234 in first direction 242. First direction 242 is a direction with respect to selected direction 230. Further, antenna control module 235 is configured to electronically steer second portion 244 of array of antenna elements 226 to receive scattered electromagnetic waves 234 in second direction 246. Second direction 246 also is a direction with respect to selected direction 230.

In particular, antenna control module 235 controls antenna system 216 to form first beam 236 in first direction 242 from scattered electromagnetic waves 234 received by first portion 240 and form second beam 238 in second direction 246 from scattered electromagnetic waves 234 received by second portion 244. In these illustrative examples, first portion 240 and second portion 244 of array of antenna elements 226 may receive scattered electromagnetic waves 234 at substantially the same time. In other words, first beam 236 and second beam 238 may be formed at substantially the same time.

Each of first direction 242 and second direction 246 comprises an elevation angle and an azimuth angle. In these illustrative examples, the azimuth angle for first direction 242 may be substantially the same as the azimuth angle for second direction 246. As one illustrative example, the elevation angle of first direction 242 may be upwards with respect to selected direction 230, while the elevation angle of second direction 246 may be downwards with respect to selected direction 230.

Transceiver 212 is configured to generate first information 248 from first signals 245 and second information 250 from second signals 247. First information 248 and second information 250 comprise information that may be present in scattered electromagnetic waves 234 received by array of antenna elements 226.

For example, transceiver 212 may be configured to identify a desired waveform in first signals 245 and in second signals 247 and then amplify these desired waveforms. Further, transceiver 212 may use demodulation and/or decoding techniques to generate first information 248 and second information 250.

In these illustrative examples, first information 248 and second information 250 are generated by transceiver 212 in a form that can be processed by signal processing module 252 in computer system 218. Signal processing module 252 may be implemented using hardware, software, or a combination of the two.

In one example, first information 248 and second information 250 may be in the form of, for example, without limitation, data extracted from first signals 245 and second signals 247, respectively, by sampling these signals. The information may be, for example, analog signals, digital signals, voltage data, and/or some other suitable type of information.

In these illustrative examples, signal processing module 252 is configured to process first information 248 and second information 250 to identify elevation angle 254. Elevation angle 254 is an angle between selected direction 230 in which beam 228 was transmitted and direction 255 of target object 225. Direction 255 is the direction in which target object 225 is located with respect to array of antenna elements 226.

In these depicted examples, signal processing module 252 is configured to identify elevation angle 254 using difference data 256. Signal processing module 252 forms difference data 256 by subtracting first information 248 from second information 250. Further, signal processing module 252 divides difference data 256 by summed data 258 to determine elevation angle 254.

Signal processing module 252 is configured to form summed data 258 by adding first information 248 and second information 250. In these illustrative examples, the presence of target object 225 may be identified using summed data 258. For example, the presence of target object 225 may be identified when summed data 258 is greater than a selected threshold. First information 248 and second information 250 may be processed to identify elevation angle 254 for target object 225 after the presence of target object 225 is confirmed.

Signal processing module 252 uses elevation angle 254 to identify height 260 of target object 225 with respect to reference height 262. Reference height 262 may be, for example, without limitation, a mean sea level, a ground level, a height of a particular land formation, a height of aircraft 206 above ground, or some other suitable reference height. Reference height 262 may be selected independently of the sensitivity of antenna system 216.

In these illustrative examples, signal processing module 252 uses elevation angle 254 and distance 264 between aircraft 206 and target object 225 to identify height 260. Distance 264 may be identified using first information 248 and second information 250 and/or information obtained using a number of other systems other than antenna system 216. For example, distance 264 may be identified using a range finder, a range meter, a laser system, and/or some other suitable type of system configured to identify distance 264 between aircraft 206 and target object 225.

In this manner, object detection system 202 provides a system for detecting an object and identifying a height of the detected object using a single array of antenna elements. Further, this array of antenna elements may be reconfigurable. For example, the sensitivity of antenna system 216 in detecting the presence of a target object may be manipulated. Further, the accuracy of the identification of height 260 made using antenna system 216 may be manipulated.

In particular, the elevation angles for first direction 242 for first beam 236 and second direction 246 for second beam 238 may be selected relative to the elevation angle for selected direction 230 to provide a desired level of sensitivity for antenna system 216 and a desired level of accuracy for the identification of height 260 of target object 225. First direction 242 and second direction 246 may be selected as having an offset from selected direction 230 of a substantially same magnitude in an elevation direction for beam 228.

The accuracy of the identification of elevation angle 254 may increase as the offset is increased. In other words, when the elevation angles for first direction 242 and second direction 246 are selected as being further away from the elevation angle for selected direction 230, the accuracy of the identification of height 260 may be increased as compared to when the elevation angles for first direction 242 and second direction 246 are selected as being closer to the elevation angle for selected direction 230.

Further, when the elevation angles for first direction 242 and second direction 246 are selected as being further away from the elevation angle for selected direction 230, the sensitivity of antenna system 216 to detect the presence of an object may be decreased as compared to when the elevation angles for first direction 242 and second direction 246 are selected as being closer to the elevation angle for selected direction 230.

In this manner, the accuracy of the identification of height 260 using elevation angle 254 may be increased as the sensitivity of antenna system 216 is decreased. However, the sensitivity may not decrease as much as the accuracy increases. As a result, first direction 242 and second direction 246 may be selected to provide a desired level of accuracy for the identification of elevation angle 254 and/or height 260 that does not decrease the sensitivity of antenna system 216 more than desired.

Further, antenna control module 235 allows array of antenna elements 226 to be electronically steered to provide a desired level of accuracy for the identification of height 260 such that physical changes to array of antenna elements 226 are not needed.

The illustration of object identification environment 200 in FIG. 2 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, a second array of antenna elements may be used to transmit beam 228 instead of array of antenna elements 226. In other illustrative examples, only a portion of array of antenna elements 226 may be used to transmit electromagnetic waves 222 in the form of beam 228. Further, in some cases, computer system 218 may be configured to control the operation of other antenna systems in addition to antenna system 216.

In still other illustrative examples, a transmitter and a receiver may be used in place of transceiver 212. The transmitter may be used to send signals 220 to antenna system 216. The receiver may be used to receive first signals 245 and second signals 247 from antenna system 216 and generate first information 248 and second information 250, respectively.

Further, although an advantageous embodiment has been described with respect to platform 204 in the form of aircraft 206, the different advantageous embodiments may be applied to other types of platforms. For example, without limitation, platform 204 may take the form of a mobile platform, a stationary platform, a land-based structure, an aquatic-based structure, a space-based structure, a submarine, a bus, a personnel carrier, a tank, a train, an automobile, a spacecraft, a space station, a satellite, a surface ship, a power plant, a dam, a manufacturing facility, a building and/or some other suitable platform.

With reference now to FIG. 3, an illustration of an antenna is depicted in accordance with an advantageous embodiment. In this illustrative example, antenna 300 is an example of one implementation for one of number of antennas 224 in FIG. 2. Antenna 300 is a phased array antenna in this depicted example. As illustrated, antenna 300 comprises array of antenna elements 302. Array of antenna elements 302 is a two-dimensional array.

In this illustrative example, array of antenna elements 302 has first length 304, $L_{AZ}$, corresponding to an azimuth angle and second length 306, $L_{EL}$, corresponding to an elevation angle. First length 304 is longer than second length 306 in this illustrative example.

Array of antenna elements 302 may be configured to transmit electromagnetic waves in the form of a beam in a selected direction. This selected direction may include an elevation angle and an azimuth angle with respect to an axis through array of antenna elements 302 that is substantially perpendicular to array of antenna elements 302. In this illustrative example, all of array of antenna elements 302 are used to transmit the electromagnetic waves.

Array of antenna elements 302 may also be configured to receive scattered electromagnetic waves generated in response to the transmission of the electromagnetic waves. In this illustrative example, first sub-array 308, second sub-array 310, third sub-array 312, and fourth sub-array 314 of array of antenna elements 302 are configured to receive the scattered electromagnetic waves.

First sub-array 308 and second sub-array 310 form first portion 311 of array of antenna elements 302. First portion 311 of array of antenna elements 302 may be electronically steered to receive the scattered electromagnetic waves in the form of a first beam in a first direction with respect to the selected direction in which the electromagnetic waves were transmitted.

Third sub-array 312 and fourth sub-array 314 form second portion 315 of array of antenna elements 302. Second portion 315 may be electronically steered to receive the scattered electromagnetic waves in the form of a second beam in a second direction with respect to the selected direction in which the electromagnetic waves were transmitted. As one illustrative example, first sub-array 308 and second sub-array 310 may be steered upwards, while third sub-array 312 and fourth sub-array 314 may be steered downwards.

With reference now to FIG. 4, an illustration of a single column of an antenna is depicted in accordance with an advantageous embodiment. In this illustrative example, a single column of antenna 300 from FIG. 3 is depicted. Antenna elements 400, 402, 404, and 406 form column 408 in array of antenna elements 302 for antenna 300.

As depicted, phase adjusters 410, 412, 414, and 416 are connected to antenna elements 400, 402, 404, and 406, respectively. These phase adjusters are configured to adjust the phase and/or time delay for the corresponding antenna elements to electronically steer the beam formed by the antenna elements when transmitting and/or receiving electromagnetic waves. Phase adjusters 410, 412, 414, and 416 may be controlled using, for example, antenna control module 235 in computer system 218 in FIG. 2.

Figure 5:
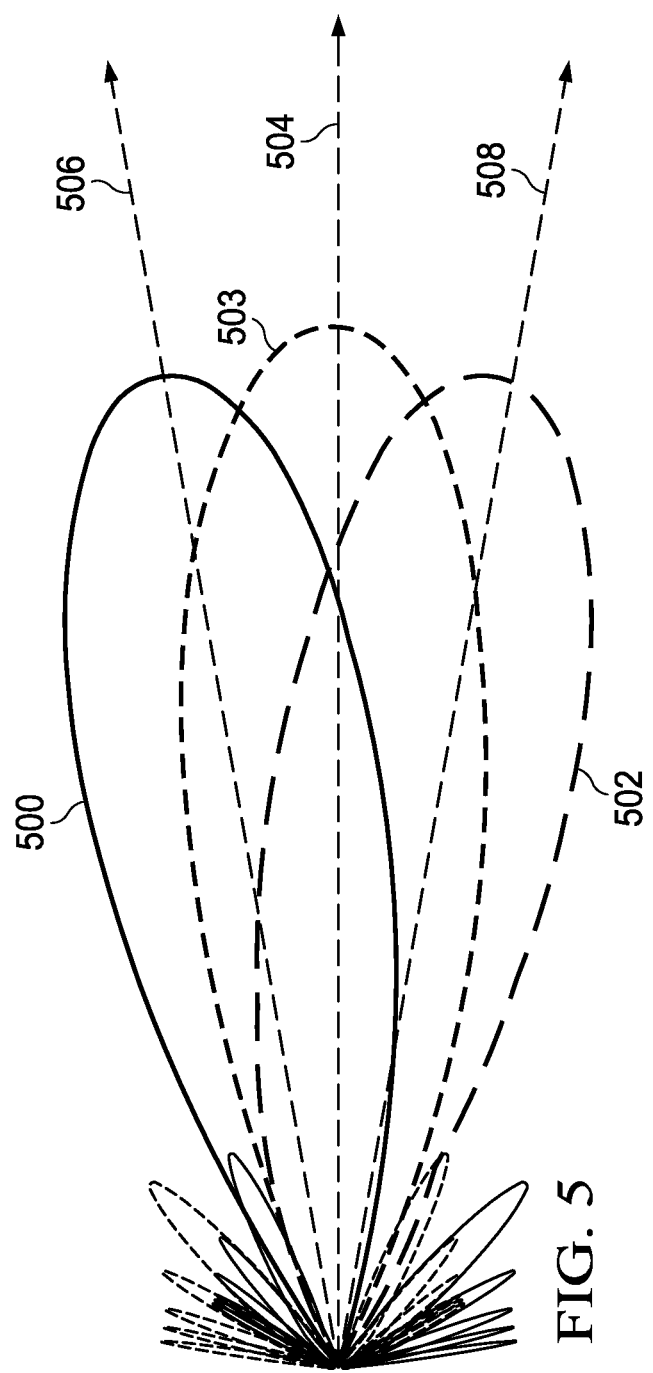
FIG. 5 is an illustration of beams received by an antenna in accordance with an advantageous embodiment.

With reference now to FIG. 5, an illustration of beams received by an antenna is depicted in accordance with an advantageous embodiment. In this illustrative example, beam 500 and beam 502 may be formed in response to receiving scattered electromagnetic waves by an antenna, such as, for example, antenna 300 in FIG. 3. In particular, beam 500 and beam 502 are formed in response to the transmission of beam 503 by antenna 300. In this depicted example, the transmission of beam 503 is in selected direction 504.

As depicted, beam 500 is formed using first portion 311 of array of antenna elements 302 in FIG. 3 in first direction 506. First direction 506 is upwards with respect to selected direction 504 in this illustrative example. Beam 502 is formed using second portion 315 of array of antenna elements 302 in FIG. 3 in second direction 508. Second direction 508 is downwards with respect to selected direction 504. In this illustrative example, first direction 506 and second direction 508 may have a same azimuth angle as selected direction 504 but different elevation angles with respect to selected direction 504.

With reference now to FIG. 6, an illustration of an image of a transmission pattern for an antenna is depicted in accordance with an advantageous embodiment. In this illustrative example, image 600 of transmission pattern 602 is depicted with respect to azimuth angle 604 and elevation angle 606.

Transmission pattern 602 is the pattern of transmission of beam 503 in FIG. 5 by antenna 300 in FIG. 3. As depicted, selected direction 504 for beam 503 comprises an azimuth angle of about zero degrees relative to the axis of antenna 300 and an elevation angle of about zero degrees relative to the axis of antenna 300.

Turning now to FIG. 7, an illustration of an image of a receive pattern for an antenna is depicted in accordance with an advantageous embodiment. In this illustrative example, image 700 of receive pattern 702 is depicted with respect to azimuth angle 704 and elevation angle 706.

Receive pattern 702 is the amplitude pattern for a beam received by first portion 311 of antenna 300 in FIG. 3. In particular, receive pattern 702 is the amplitude pattern for beam 500 in FIG. 5 received in response to the transmission of beam 503 in FIG. 5. In other words, beam 500 is received with receive pattern 702 in response to the transmission of beam 503 with transmission pattern 602 in FIG. 6.

As depicted, first direction 506 for beam 500 has an elevation angle of about four degrees relative to the elevation angle for selected direction 504 for beam 503 in FIG. 5. In other words, beam 500 is directed about four degrees upwards of beam 503 in FIG. 5.

With reference now to FIG. 8, an illustration of an image of a receive pattern for an antenna is depicted in accordance with an advantageous embodiment. In this illustrative example, image 800 of receive pattern 802 is depicted with respect to azimuth angle 804 and elevation angle 806.

Receive pattern 802 is the amplitude pattern for a beam received by second portion 315 of antenna 300 in FIG. 3. In particular, receive pattern 802 is the amplitude pattern for beam 502 in FIG. 5 received in response to the transmission of beam 503 in FIG. 5. In other words, beam 502 is received with receive pattern 802 in response to the transmission of beam 503 with transmission pattern 602 in FIG. 6.

As depicted, second direction 508 for beam 502 has an elevation angle of about negative four degrees relative to the elevation angle for selected direction 504 for beam 503 in FIG. 5. In other words, beam 502 is directed about four degrees downwards of beam 503 in FIG. 5.

With reference now to FIG. 9, an illustration of an image of a summation pattern is depicted in accordance with an advantageous embodiment. In this illustrative example, image 900 of summation pattern 902 is depicted with respect to azimuth angle 904 and elevation angle 906. Receive pattern 702 from FIG. 7 and receive pattern 802 from FIG. 8 are summed to form summation pattern 902 in image 900.

Turning now to FIG. 10, an illustration of an image of a difference pattern is depicted in accordance with an advantageous embodiment. In this illustrative example, image 1000 of difference pattern 1002 is depicted with respect to azimuth angle 1004 and elevation angle 1006. Receive pattern 702 from FIG. 7 is subtracted from receive pattern 802 from FIG. 8 to form difference pattern 1002 in image 1000.

Figure 11:
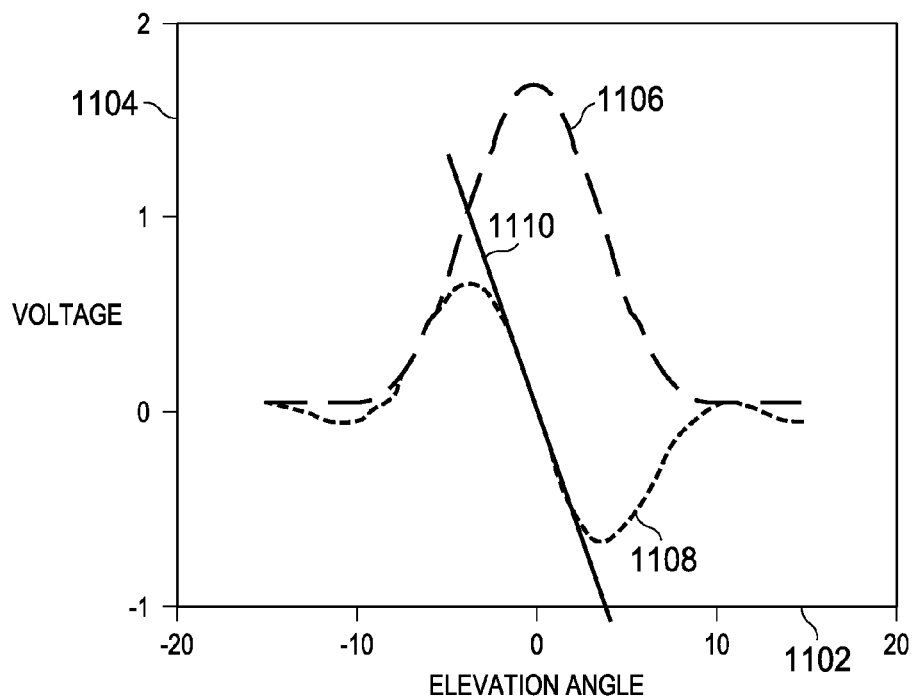
FIG. 11 is an illustration of a graph of summed data and difference data in accordance with an advantageous embodiment.

With reference now to FIG. 11, an illustration of a graph of summed data and difference data is depicted in accordance with an advantageous embodiment. In this illustrative example, graph 1100 has horizontal axis 1102 and vertical axis 1104. Horizontal axis 1102 is the elevation angle in degrees with respect to the elevation angle for selected direction 504 of beam 503 in FIG. 5. Vertical axis 1104 is voltage.

Curve 1106 represents summed data for signals generated using beam 500 and beam 502 from FIG. 5 received by antenna 300 in FIG. 3. In particular, curve 1106 represents the sum of normalized signals generated using beam 500 and beam 502 from FIG. 5.

Curve 1108 represents difference data for the signals generated using beams 500 and 502 from FIG. 5. In particular, curve 1108 represents the difference between the normalized signal generated for beam 500 and the normalized signal generated for beam 502. As illustrated, slope 1110 for curve 1108 may be used to identify an elevation angle for a target object with respect to selected direction 504 in FIG. 5.

In these illustrative examples, the elevation angle for the target object may be identified using the following equation:

$$\theta = \frac{\Lambda}{\Sigma} \frac{1}{k},$$

where $\theta$ is the elevation angle, $\Lambda$ is the difference data, $\Sigma$ is the summed data, and $k$ is a slope constant. In this illustrative example, $k$ may be a value for slope 1110 in curve 1108.

The difference data is the difference of the magnitudes or magnitudes-squared of the complex voltages for beam 500 and beam 502. The summed data is the sum of the magnitudes or magnitudes-squared of the complex voltages for beam 500 and beam 502.

The value of k depends on the offset of first direction 506 for beam 500 and second direction 508 for beam 502 with respect to selected direction 504. The offset for beam 500 may be, for example, the difference between the elevation angle for selected direction 504 and the elevation angle for first direction 506. This offset may also be referred to as a beam offset.

Figure 12:
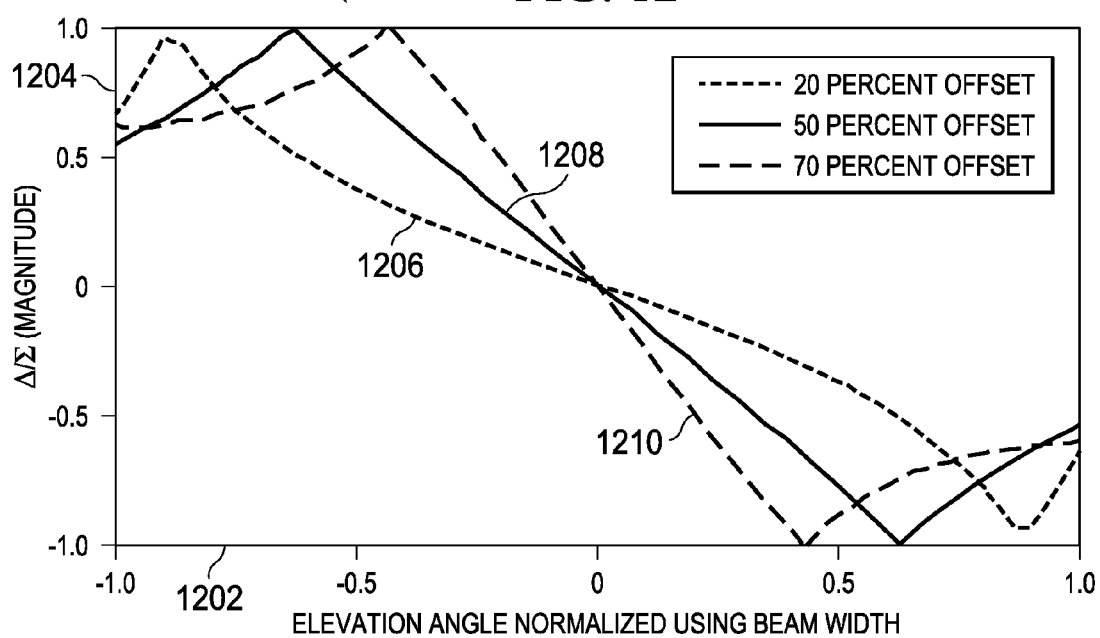
FIG. 12 is an illustration of a graph illustrating slopes for different beam offsets in accordance with an advantageous embodiment.

With reference now to FIG. 12, an illustration of a graph illustrating slopes for different beam offsets is depicted in accordance with an advantageous embodiment. In this illustrative example, graph 1200 has horizontal axis 1202 and vertical axis 1204.

Horizontal axis 1202 is the elevation angle in degrees that has been normalized. In particular, the elevation angle is the elevation angle of a target object with respect to, for example, antenna 300 in FIG. 3. This elevation angle is normalized using a beam width in the elevation direction for beam 503 in FIG. 5 transmitted by antenna 300 in FIG. 3. Vertical axis 1204 is the ratio of the voltage for the difference data to the voltage for the summed data generated for beam 500 and beam 502.

In this illustrative example, the difference data is the difference of the magnitudes-squared of the complex voltages for beam 502 and beam 503. Further, the summed data is the sum of the magnitudes-squared of the complex voltages for beam 500 and beam 502.

Curve 1206 is for a beam offset fraction of about positive and negative 0.25 for beam 500 and beam 502, respectively, from FIG. 5. The beam offset fraction is the beam offset between the elevation angles for first direction 506 for beam 500 and second direction 508 for beam 502 divided by the beam width in the elevation direction for beam 503.

For example, beam 503 may have a beam width of about 40 degrees. The elevation angle for beam 500 may be offset from the elevation angle for beam 503 about 10 degrees upwards of beam 503. The elevation angle for beam 502 may be offset from the elevation angle for beam 503 about 10 degrees downwards of beam 503.

In this case, the beam offset fraction for each of the beams may be about 0.25. In other words, beam 500 may be electronically steered upwards from the transmitted beam by about 25 percent of the beam width of the transmitted beam. Beam 502 may be electronically steered downwards from the transmitted beam by about 25 percent of the beam width of the transmitted beam.

Curve 1208 is for a beam offset fraction of about positive and negative 0.50 for beam 500 and beam 502, respectively, from FIG. 5. Curve 1210 is for a beam offset fraction of about positive and negative 0.75 for beam 500 and beam 502, respectively, from FIG. 5.

As depicted, the slope of curve 1208 is greater than the slope of curve 1206 at the portions of these curves around a ratio of about zero. The ratio may be about zero when the amplitude of the voltage for the difference data is about zero. Further, the slope of curve 1210 is greater than the slope of curve 1208 at the portions of these curves around a ratio of about zero.

In this manner, the slope increases as the beam offset fraction increases. As the slope increases, an accuracy of the identification of the elevation angle for the target object using the slope also increases. Further, as the accuracy of the identification of the elevation angle increases, the accuracy of the identification of a height of the target object with respect to a reference height using the elevation angle also increases.

Figure 13:
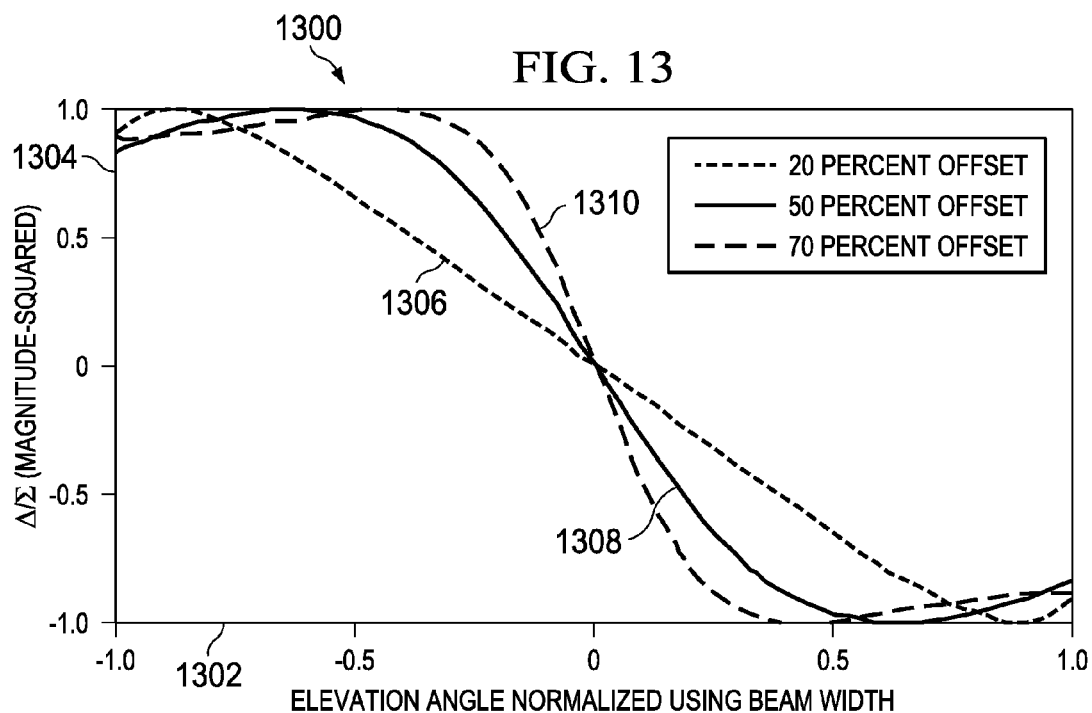
FIG. 13 is an illustration of a graph illustrating slopes for different beam offsets in accordance with an advantageous embodiment.

With reference now to FIG. 13, an illustration of a graph illustrating slopes for different beam offsets is depicted in accordance with an advantageous embodiment. In this illustrative example, graph 1300 has horizontal axis 1302 and vertical axis 1304. In this illustrative example, horizontal axis 1302 is the same as horizontal axis 1202 in FIG. 12.

Vertical axis 1304 is similar to vertical axis 1204 in FIG. 12. Vertical axis 1304 is the ratio of the voltage for the difference data to the voltage for the summed data generated for beam 500 and beam 502. However, in FIG. 13, the difference data is the difference of the magnitudes of the complex voltages for beam 502 and beam 503. Further, the summed data is the sum of the magnitudes of the complex voltages for beam 500 and beam 502.

Curve 1306 is for a beam offset fraction of about positive and negative 0.25 for beam 500 and beam 502, respectively, from FIG. 5. Curve 1308 is for a beam offset fraction of about positive and negative 0.50 for beam 500 and beam 502, respectively, from FIG. 5. Curve 1310 is for a beam offset fraction of about positive and negative 0.75 for beam 500 and beam 502, respectively, from FIG. 5.

As depicted, the slope of curve 1308 is greater than the slope of curve 1306 at the portions of these curves around a ratio of about zero. The ratio may be about zero when the amplitude of the voltage for the difference data is about zero. Further, the slope of curve 1310 is greater than the slope of curve 1308 at the portions of these curves around a ratio of about zero.

Figure 14:
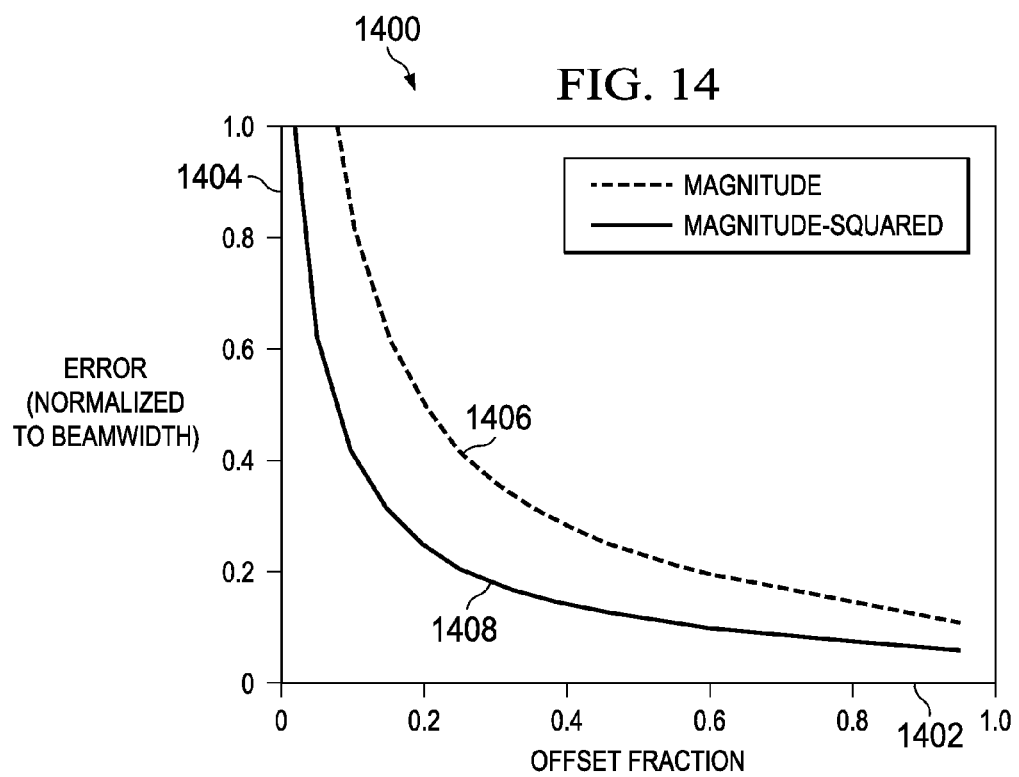
FIG. 14 is an illustration of a graph for the accuracy of an identification of an elevation angle in accordance with an advantageous embodiment.

With reference now to FIG. 14, an illustration of a graph for the accuracy of an identification of an elevation angle is depicted in accordance with an advantageous embodiment. In this illustrative example, graph 1400 has horizontal axis 1402 and vertical axis 1404. Horizontal axis 1402 is the beam offset fraction. Vertical axis 1404 is an error in the identification of an elevation angle for a target object using beam 500 and beam 502 from FIG. 5. This error has been normalized to the beam width.

As depicted, curve 1406 represents the error in the identification of the elevation angle using the magnitudes of the complex voltages for beam 500 and beam 502 in which these two beams are offset from beam 503 by substantially the same magnitude. Curve 1408 represents the error in the identification of the elevation angle using the magnitudes-squared of the complex voltages for beam 500 and beam 502 in which these two beams are offset from beam 503 by substantially the same magnitude.

As depicted with both curve 1406 and curve 1408, the error in the identification of the elevation angle decreases as the beam offset fraction increases. In other words, the accuracy of the identification of the elevation angle increases as the beam offset fraction increases.

The error for the identification of the elevation angle for the target object may be calculated using the following equation:

$$\sigma_\theta = \frac{1}{k\sqrt{SNR}}$$

where $\sigma_\theta$ is the error in the identification of the elevation angle, k is the slope constant, and SNR is the signal-to-noise ratio for the summed data. As illustrated, the error decreases as the slope constant increases.

Figure 15:
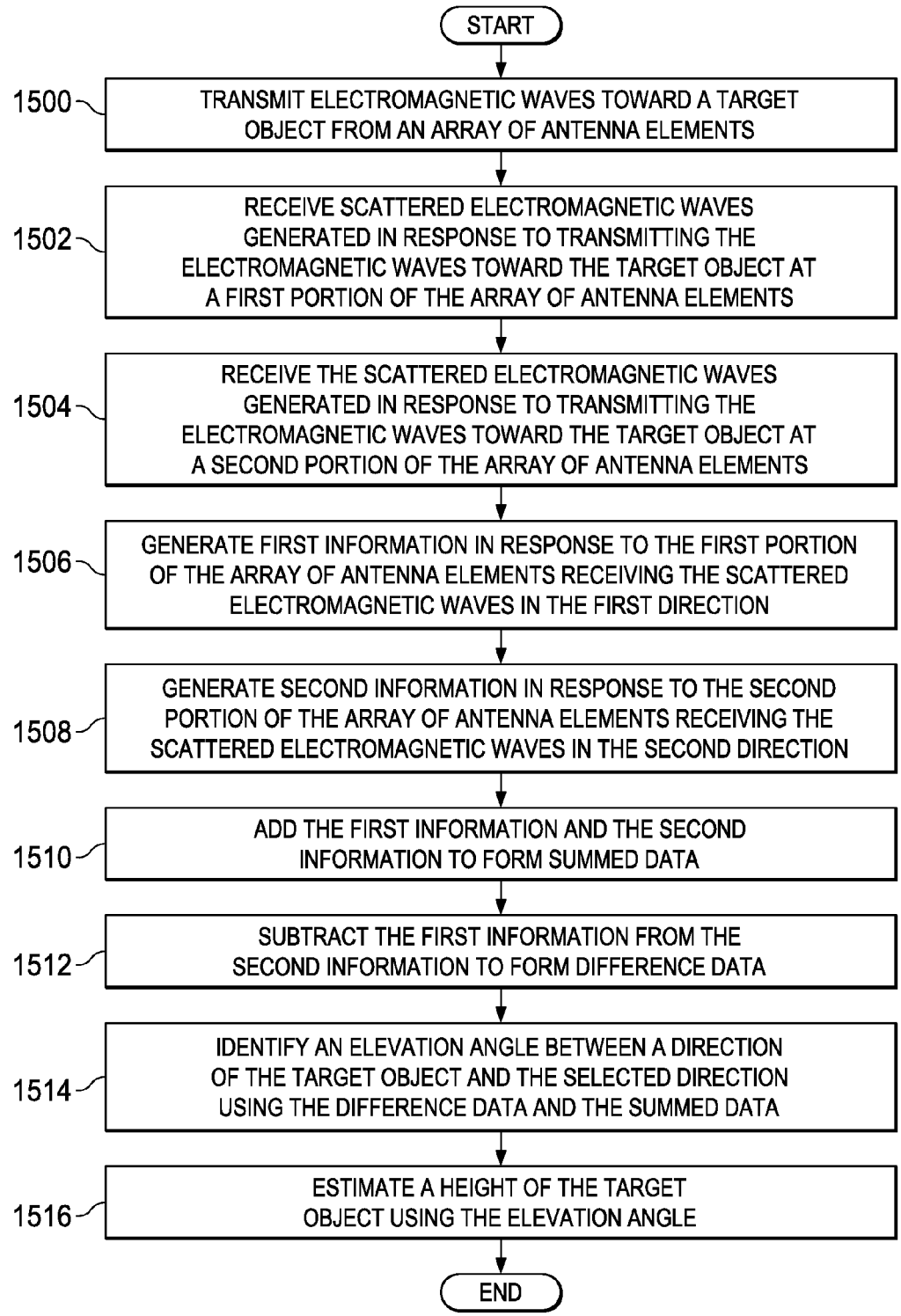
FIG. 15 is an illustration of a flowchart of a process for processing waveforms in accordance with an advantageous embodiment.

With reference now to FIG. 15, an illustration of a flowchart of a process for processing electromagnetic waves is depicted in accordance with an advantageous embodiment. The process illustrated in FIG. 15 may be implemented using object detection system 202 in FIG. 2.

The process begins by transmitting electromagnetic waves toward a target object from an array of antenna elements (operation 1500). In operation 1500, the electromagnetic waves are transmitted in the form of a beam and in a selected direction. The selected direction includes an azimuth angle and an elevation angle.

The process then receives scattered electromagnetic waves generated in response to transmitting the electromagnetic waves toward the target object at a first portion of the array of antenna elements (operation 1502). In operation 1502, the scattered electromagnetic waves are received by the first portion of the array of antenna elements in a first direction with respect to the selected direction in which the electromagnetic waves were transmitted.

The process also receives the scattered electromagnetic waves generated in response to transmitting the electromagnetic waves toward the target object at a second portion of the array of antenna elements (operation 1504). In operation 1504, the scattered electromagnetic waves are received by the second portion of the array of antenna elements in a second direction with respect to the selected direction in which the electromagnetic waves were transmitted.

In this illustrative example, operation 1502 and operation 1504 are performed at substantially the same time. In other words, the scattered electromagnetic waves are received by the first portion and the second portion of the array of antenna elements substantially simultaneously.

The process then generates first information in response to the first portion of the array of antenna elements receiving the scattered electromagnetic waves in the first direction (operation 1506). The process generates second information in response to the second portion of the array of antenna elements receiving the scattered electromagnetic waves in the second direction (operation 1508).

Next, the process adds the first information and the second information to form summed data (operation 1510). The process subtracts the first information from the second information to form difference data (operation 1512).

Thereafter, the process identifies an elevation angle between a direction of the target object and the selected direction using the difference data and the summed data (operation 1514). In operation 1514, the process multiplies a slope constant by a ratio of the difference data to the summed data to identify the elevation angle. Next, the process estimates a height of the target object with respect to a reference height using the elevation angle (operation 1516), with the process terminating thereafter.

The flowchart and block diagrams in the different depicted embodiments illustrate the architecture, functionality, and operation of some possible implementations of apparatus and methods in an advantageous embodiment. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowchart or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 16, an illustration of a data processing system is depicted in accordance with an advantageous embodiment. In this illustrative example, data processing system 1600 may be used to implement one or more computers in computer system 218 in FIG. 2. As depicted, data processing system 1600 includes communications framework 1602, which provides communications between processor unit 1604, memory 1606, persistent storage 1608, communications unit 1610, input/output (I/O) unit 1612, and display 1614.

Processor unit 1604 serves to execute instructions for software that may be loaded into memory 1606. Processor unit 1604 may be a number of processors, a multi-processor core, or some other type of processor, depending on the particular implementation. A number, as used herein with reference to an item, means one or more items. Further, processor unit 1604 may be implemented using a number of heterogeneous processor systems in which a main processor is present with secondary processors on a single chip. As another illustrative example, processor unit 1604 may be a symmetric multi-processor system containing multiple processors of the same type.

Memory 1606 and persistent storage 1608 are examples of storage devices 1616. A storage device is any piece of hardware that is capable of storing information, such as, for example, without limitation, data, program code in functional form, and/or other suitable information either on a temporary basis and/or a permanent basis. Storage devices 1616 may also be referred to as computer readable storage devices in these examples. Memory 1606, in these examples, may be, for example, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a flash memory, a rewritable optical disk, a rewritable magnetic tape, or some combination of the above. The media used by persistent storage 1608 also may be removable. For example, a removable hard drive may be used for persistent storage 1608.

Communications unit 1610, in these examples, provides for communications with other data processing systems or devices. In these examples, communications unit 1610 is a network interface card. Communications unit 1610 may provide communications through the use of either or both physical and wireless communications links.

Input/output unit 1612 allows for input and output of data with other devices that may be connected to data processing system 1600. For example, input/output unit 1612 may provide a connection for user input through a keyboard, a mouse, and/or some other suitable input device. Further, input/output unit 1612 may send output to a printer. Display 1614 provides a mechanism to display information to a user.

Instructions for the operating system, applications, and/or programs may be located in storage devices 1616, which are in communication with processor unit 1604 through communications framework 1602. In these illustrative examples, the instructions are in a functional form on persistent storage 1608. These instructions may be loaded into memory 1606 for execution by processor unit 1604. The processes of the different embodiments may be performed by processor unit 1604 using computer-implemented instructions, which may be located in a memory, such as memory 1606.

These instructions are referred to as program code, computer usable program code, or computer readable program code that may be read and executed by a processor in processor unit 1604. The program code in the different embodiments may be embodied on different physical or computer readable storage media, such as memory 1606 or persistent storage 1608.

Program code 1618 is located in a functional form on computer readable media 1620 that is selectively removable and may be loaded onto or transferred to data processing system 1600 for execution by processor unit 1604. Program code 1618 and computer readable media 1620 form computer program product 1622 in these examples. In one example, computer readable media 1620 may be computer readable storage media 1624 or computer readable signal media 1626.

Computer readable storage media 1624 may include, for example, an optical or magnetic disk that is inserted or placed into a drive or other device that is part of persistent storage 1608 for transfer onto a storage device, such as a hard drive, that is part of persistent storage 1608. Computer readable storage media 1624 also may take the form of a persistent storage, such as a hard drive, a thumb drive, or a flash memory, that is connected to data processing system 1600. In some instances, computer readable storage media 1624 may not be removable from data processing system 1600.

In these examples, computer readable storage media 1624 is a physical or tangible storage device used to store program code 1618 rather than a medium that propagates or transmits program code 1618. Computer readable storage media 1624 is also referred to as a computer readable tangible storage device or a computer readable physical storage device. In other words, computer readable storage media 1624 is a media that can be touched by a person.

Alternatively, program code 1618 may be transferred to data processing system 1600 using computer readable signal media 1626. Computer readable signal media 1626 may be, for example, a propagated data signal containing program code 1618. For example, computer readable signal media 1626 may be an electromagnetic signal, an optical signal, and/or any other suitable type of signal. These signals may be transmitted over communications links, such as wireless communications links, optical fiber cable, coaxial cable, a wire, and/or any other suitable type of communications link.

In other words, the communications link and/or the connection may be physical or wireless in the illustrative examples.

In some advantageous embodiments, program code 1618 may be downloaded over a network to persistent storage 1608 from another device or data processing system through computer readable signal media 1626 for use within data processing system 1600. For instance, program code stored in a computer readable storage medium in a server data processing system may be downloaded over a network from the server to data processing system 1600. The data processing system providing program code 1618 may be a server computer, a client computer, or some other device capable of storing and transmitting program code 1618.

The different components illustrated for data processing system 1600 are not meant to provide architectural limitations to the manner in which different embodiments may be implemented. The different advantageous embodiments may be implemented in a data processing system including components in addition to or in place of those illustrated for data processing system 1600. Other components shown in FIG. 16 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1604 may take the form of a hardware unit that has circuits that are manufactured or configured for a particular use. This type of hardware may perform operations without needing program code to be loaded into a memory from a storage device to be configured to perform the operations.

For example, when processor unit 1604 takes the form of a hardware unit, processor unit 1604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1618 may be omitted because the processes for the different embodiments are implemented in a hardware unit.

In still another illustrative example, processor unit 1604 may be implemented using a combination of processors found in computers and hardware units. Processor unit 1604 may have a number of hardware units and a number of processors that are configured to run program code 1618. With this depicted example, some of the processes may be implemented in the number of hardware units, while other processes may be implemented in the number of processors.

In another example, a bus system may be used to implement communications framework 1602 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1606, or a cache, such as found in an interface and memory controller hub that may be present in communications framework 1602.

Thus, the different advantageous embodiments provide a method and apparatus for processing electromagnetic waves. One or more of the different advantageous embodiments may be used to identify information about a target object that may include identifying the height of the target object.

In one advantageous embodiment, electromagnetic waves are transmitted towards a target object in a selected direction from an array of antenna elements. Scattered electromagnetic waves generated in response to transmitting the electromagnetic waves are received at a first portion of the array in a first direction with respect to the selected direction. The scattered electromagnetic waves are received at a second portion of the array in a second direction with respect to the selected direction. First information in the scattered electromagnetic waves received by the first portion of the second array of antenna elements is subtracted from second information in the scattered electromagnetic waves received by the second portion of the second array of antenna elements to form difference data. An elevation angle is identified between a direction of the target object and the selected direction using the difference data.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing electromagnetic waves, the method comprising:

transmitting the electromagnetic waves in a selected direction toward a target object from a first array of antenna elements;

receiving scattered electromagnetic waves generated from the electromagnetic waves transmitted in the selected direction at a first portion of a second array of antenna elements configured to receive the scattered electromagnetic waves in a first direction with respect to the selected direction and at a second portion of the second array of antenna elements configured to receive the scattered electromagnetic waves in a second direction with respect to the selected direction;

subtracting, by a processor, first information in the scattered electromagnetic waves received by the first portion of the second array of antenna elements from second information in the scattered electromagnetic waves received by the second portion of the second array of antenna elements to form difference data;

generating the first information from first signals generated by the second array of antenna elements in response to the first portion of the second array of antenna elements being electronically steered to receive the scattered electromagnetic waves in the first direction;

generating the second information from second signals generated by the second array of antenna elements in response to the second portion of the second array of antenna elements being electronically steered to receive the scattered electromagnetic waves in the second direction; and identifying an elevation angle between a direction of the target object and the selected direction using the difference data.

2. The method of claim 1 further comprising:
adding the first information and the second information to form summed data; and
identifying a presence of the target object using the summed data.

3. The method of claim 2, wherein the step of identifying the elevation angle for the target object using the difference data comprises:
identifying the elevation angle as a product of a slope constant and a ratio of the difference data to the summed data.

4. The method of claim 1 further comprising:
estimating a height of the target object using the elevation angle.

5. The method of claim 1, wherein the step of identifying the elevation angle comprises:
identifying a slope of a curve representing the difference data; and
identifying a product of the inverse of the slope of the curve and a ratio of the difference data to summed data.

6. The method of claim 5 further comprising:
determining a desired level of accuracy for an identification of the elevation angle; and
selecting the first direction and the second direction to obtain the desired level of accuracy for the identification of the elevation angle, wherein the first direction and the second direction have an offset from the selected direction of a substantially same magnitude in an elevation direction and wherein a level of accuracy for the identification of the elevation angle increases as the offset increases.

7. The method of claim 1, wherein the second array of antenna elements has a first length that is longer than a second length of the second array of antenna elements.

8. The method of claim 1, wherein the first array of antenna elements is the second array of antenna elements.

9. The method of claim 1, wherein the first array of antenna elements and the second array of antenna elements are selected from a two-dimensional array of antenna elements and a three-dimensional array of antenna elements.

10. The method of claim 1, wherein the first direction and the second direction have a substantially same azimuth angle as the selected direction.

11. An apparatus comprising:
a first array of antenna elements configured to transmit electromagnetic waves toward a target object, wherein the electromagnetic waves are transmitted having a selected direction;
a second array of antenna elements, wherein a first portion of the second array of antenna elements is configured to receive scattered electromagnetic waves generated in response to transmitting the electromagnetic waves toward the target object in a first direction with respect to the selected direction; and wherein a second portion of the second array of antenna elements is configured to receive the scattered electromagnetic waves in a second direction with respect to the selected direction; and
a signal processing module configured to subtract first information in the scattered electromagnetic waves received by the first portion of the second array of antenna elements from second information in the scattered electromagnetic waves received by the second portion of the second array of antenna elements to form difference data; and identify an elevation angle between a direction of the target object and the selected direction using the difference data, wherein the first portion of the second array of antenna elements is configured to generate first signals in response to the first portion of the second array of antenna elements being electronically steered to receive the scattered electromagnetic waves in the first direction and wherein the second portion of the second array of antenna elements is configured to generate second signals in response to the second portion of the second array of antenna elements being electronically steered to receive the scattered electromagnetic waves in the second direction.

12. The apparatus of claim 11, wherein the signal processing module is further configured to add the first information and the second information to form summed data; and
identify a presence of the target object using the summed data.

13. The apparatus of claim 11, further comprising:
a transceiver connected to the second array of antenna elements by a transmission medium, wherein the transceiver is configured to receive the first signals and the second signals from the second array of antenna elements and generate the first information from the first signals and the second information from the second signals.

14. The apparatus of claim 11, wherein the signal processing module is further configured to estimate a height of the target object using the elevation angle.

15. The apparatus of claim 11, wherein the first array of antenna elements is the second array of antenna elements.

16. The apparatus of claim 11, wherein the first direction and the second direction have a substantially same azimuth angle as the selected direction.

17. The apparatus of claim 11, wherein the first array of antenna elements and the second array of antenna elements are associated with a platform selected from one of an aircraft, an unmanned aerial vehicle, and a helicopter.

18. An apparatus comprising:
an array of antenna elements configured to transmit electromagnetic waves in a selected direction toward a target object, wherein a first portion of the array of antenna elements is electronically steered to receive scattered electromagnetic waves in a first direction with respect to the selected direction and a second portion of the array of antenna elements is electronically steered to receive the scattered electromagnetic waves in a second direction with respect to the selected direction in which the scattered electromagnetic waves are generated in response to transmitting the electromagnetic waves toward the target object;
a transceiver connected to the array of antenna elements by a transmission medium, wherein the transceiver is configured to generate first information from first signals received from the array of antenna elements in response to the first portion of the array of antenna elements receiving the scattered electromagnetic waves in the first direction and generate second information from second signals received from the array of antenna elements in response to the second portion of the array of antenna elements receiving the scattered electromagnetic waves in the second direction; and
a signal processing module configured to add the first information and the second information to form summed data; subtract the first information from the second information to form difference data; and identify an elevation angle between a direction of the target object and the selected direction using the difference data and the summed data.

19. The apparatus of claim 18, wherein the first direction and the second direction have a substantially same azimuth angle as the selected direction.

20. The method of claim 1, wherein the steps of generating the first information and generating the second information include electronically steering, the electronically steering including at least one of controlling time delays and phase for signals.

21. The method of claim 1, wherein an electronic steering further controls an accuracy and a sensitivity of the first array of antenna elements and the second array of antenna elements.

22. The method of claim 1, wherein the steps of generating the first information and generating the second information include independently electronically steering the first portion of the second array of antenna elements and the second portion of the second array of antenna elements.

\* \* \* \* \*